United States Patent

Jarry

[11] 4,067,301
[45] Jan. 10, 1978

[54] TWO-STROKE ENGINE

[75] Inventor: Philippe Jarry, Sevres, France

[73] Assignee: Le Moteur Moderne, Boulogne-Billancourt, France

[21] Appl. No.: 658,857

[22] Filed: Feb. 18, 1976

[51] Int. Cl.² .................. F02B 41/00; F02B 3/00; F02B 23/00

[52] U.S. Cl. .................. 123/26; 123/32 B; 123/32 K; 123/191 R; 123/191 S

[58] Field of Search ............ 123/325 P, 22, 26, 32 B, 123/37, 191 S, 191 SP, 191 R, 193 R, 193 CH, 193 CP, 193 H, 193 P

[56] References Cited

U.S. PATENT DOCUMENTS

| 820,285 | 5/1906 | Cross | 123/37 |
|---|---|---|---|
| 1,772,742 | 8/1930 | Barrett | 123/32 B |
| 1,856,328 | 5/1932 | French | 123/32 B |
| 1,874,569 | 8/1932 | Meyer | 123/191 R |
| 2,107,792 | 2/1938 | Huesby | 123/32 B |
| 2,254,438 | 9/1941 | McCarthy | 123/191 SP |
| 2,511,992 | 6/1950 | Quick | 123/32 B |
| 3,973,530 | 8/1976 | Seidel | 123/32 B |

FOREIGN PATENT DOCUMENTS 148,856  11/1931  Switzerland ............ 123/32 B

Primary Examiner—Charles J. Myhre
Assistant Examiner—William Randolph
Attorney, Agent, or Firm—Finnegan, Henderson, Farabow & Garrett

[57] ABSTRACT

A two-stroke engine including a combustion chamber formed in the cylinder head and having the fuel mixture introduced directly into the combustion chamber. A ventilation chamber surrounds the combustion chamber and opens directly into the combustion chamber and the cylinder, a flange on the head of the piston, progressively closing the opening into the combustion chamber as the piston approaches top dead center. The ventilation chamber may be formed as a plurality of individual chambers evenly distributed around the combustion chamber or as a recess opposite the outer periphery of the piston head. In the latter embodiment, an annular recess on the piston head, formed by the flange, adds to the volume of the ventilation chamber.

4 Claims, 3 Drawing Figures

TWO-STROKE ENGINE

The present invention concerns a two-stroke engine having a cylinder in which a piston is movable and a cylinder head whose bottom face forms an impeller surface around the combustion chamber.

It is known that in engines a turbulence speeds up and improves the combustion, on the one hand by ensuring an energetic mixing of the combustible mixture and, on the other, by reducing the flash distance, the first portion of gas touched by the spark being dragged into the whirling movement of the gases, thus multiplying the ignition sites.

The impeller surface whose role is precisely to promote the turbulence plays therefore a part in the proper working of two-stroke engines.

Experience has shown however that in these engines some gas particles remain at the end of the compression stroke between the impeller surface and the piston, instead of being driven into the combustion chamber, and collect at the outside periphery of this impeller surface. Since the ignition wave has difficulty in reaching them in this location, their combustion is incompletely effected, which causes fouling of the cylinder and causes considerable pollution of the atmosphere by the outputting of a relatively large amount of unburnt gases from the exhaust.

Moreover, when the piston approaches top dead center, the pressure in the combustion chamber increases with great speed, which causes furthermore a hard combustion and the production of noise.

The present invention contemplates therefore eliminating these disadvantages and, to achieve this, it has as its object a two-stroke engine which is characterized in that it comprises in the impeller surface a ventilation chamber whose connection with the combustion chamber is progressively closed by the piston when it moves towards top dead center.

This arrangement reduces in large measure the occurrence of fouling and the formation of unburnt gases. At the end of the compression stroke, the portions of gas remaining between the cylinder head and the piston no longer accumulate in fact at the external periphery of the impeller surface, but are driven into the ventilation chamber where they can be easily reached by the ignition wave, immediately after the piston passes to top dead center.

Furthermore, the presence of this chamber permits a slower pressure build-up and a lower maximum pressure, which improves the progressiveness of the combustion and reduces noise formation.

Finally, it is possible to use a weaker mixture, the overall richness of this mixture being as low as 0.4, in particular if a stratification is formed.

According to a first embodiment of the invention, the ventilation chamber consists of elementary ventilation chambers uniformly distributed in the impeller surface and opening, each one, into the combustion chamber by means of a connecting aperture whose progressive closing is accomplished by means of a flange on the piston.

It can be easily understood that at the end of the compression stroke, the gases lying between the thus divided-up impeller surface and the corresponding surface of the upperface of the piston are driven into the elementary chambers and that they can be reached by the ignition wave, immediately after the piston has passed to top dead center.

According to a second embodiment, the ventilation chamber is formed by an annular recess provided on the external periphery of the impeller surface.

In this case, the gases lying at the end of the compression stroke between the impeller surface and the corresponding surface of the upper face of the piston are directed into the combustion chamber and into the ventilation chamber where they can again be reached by the ignition wave immediately after the piston has passed to top dead center.

The piston can of course be provided with a flange defining an external annular recess whose volume is added to that of the ventilation chamber.

This annular recess permits an even slower pressure build-up and a lower maximum pressure. The progressiveness of the combustion is thus again improved.

Other objects, features and advantages of the invention will be apparent from the following detailed description taken in conjunction with the accompanying drawings which illustrate two preferred embodiments which the invention may assume in practice.

Figure 1:
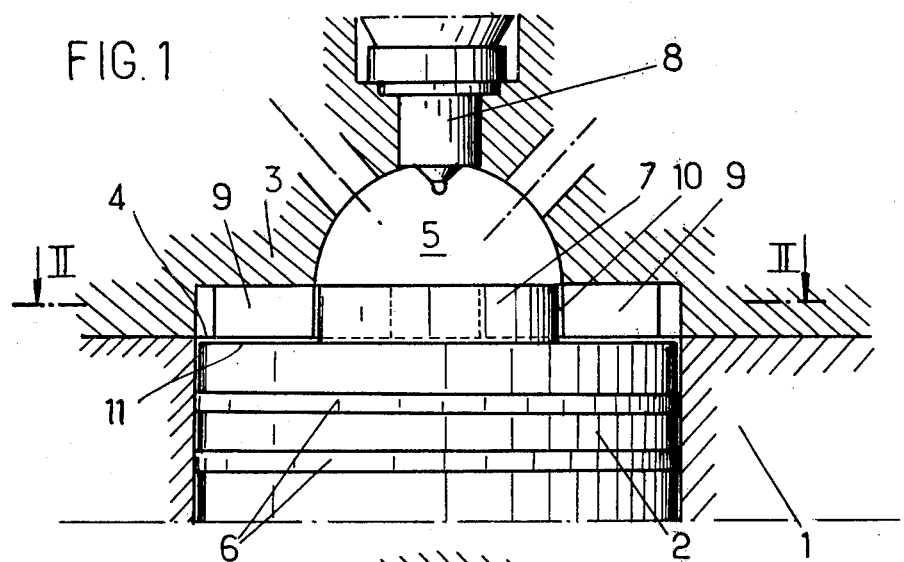
FIG. 1 is a partial sectional view of a two-stroke engine according to the invention.

The two-stroke engine according to the invention comprises a cylinder in which a piston 2 is movable and a cylinder head 3 whose lower face forms an impeller surface 4 around the combustion chamber 5. It will be noted that this latter is hemispherical but it could of course have any other suitable shape.

In the illustrated embodiments, piston 2 which carries in a known way piston-rings in its side wall, is provided with a flange 7 on its upper face. The cylinder head 3 has three apertures opening into the combustion chamber for receiving respectively an injector 8 and two sparking plugs (not shown).

According to the invention the engine has in the impeller surface 4 a ventilation chamber whose connection with the combustion chamber is progressively closed by the piston when it moves towards top dead center.

Figure 2:
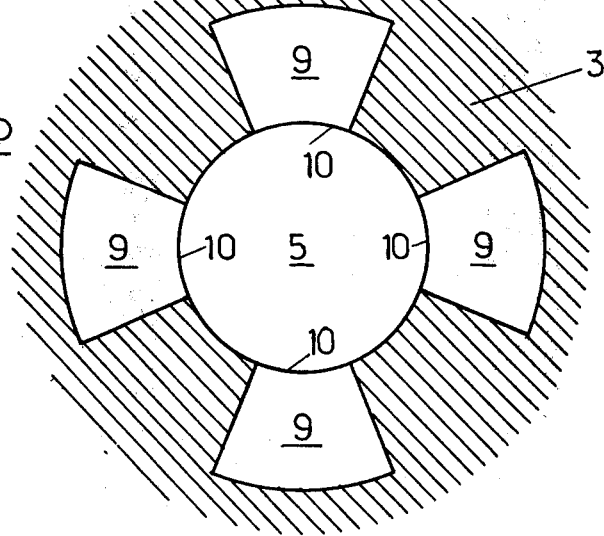
FIG. 2 is a sectional view along the line II—II of FIG. 1, the piston not being illustrated.

According to the first embodiment shown in FIGS. 1 and 2, the ventilation chamber comprises four elementary combustion chambers 9 distributed uniformly in the impeller surface 4 and each opening into the combustion chamber 5 by means of a connecting aperture 10 which is progressively closed by the flange 7.

It is be noted that the flange 7 has a section such that it can completely penetrate into the combustion chamber with very little play but enough to allow contactless operation. Thus, when the piston is at top dead center, the annular surface 11 of its upper face engages with the impeller surface 4 whilst the connecting apertures 10 are completely closed by the flange.

When the flange 7 penetrates into the combustion chamber, the particles of gas lying in the space defined by the annular surface 11 and the impeller surface 4 are subjected to a high turbulence and are driven progressively into the elementary combustion chambers 9.

At the end of the compression stroke, when this space is cancelled out, they are all transferred into these chambers, then when the piston passes top dead center, they are immediately reached by the ignition wave, which is not the case with conventional two-stroke engines wherein the combustion is incomplete for this reason.

It can then be easily appreciated that the presence of these elementary chambers permits a considerable reduction in the formation of unburnt gases and, consequently, of atmospheric pollution.

It will also be noted that, because of these chambers, the maximum pressure of the cycle is lower and that the progressiveness of the combustion is thus improved, which avoids noise production.

Finally, since the still relatively large turbulence created by the impeller surface increases the speed of combustion by ensuring energetic mixing of the combustible mixture, this latter may be very weak, its overall richness being as low 0.4, especially when it is stratified.

Figure 3:
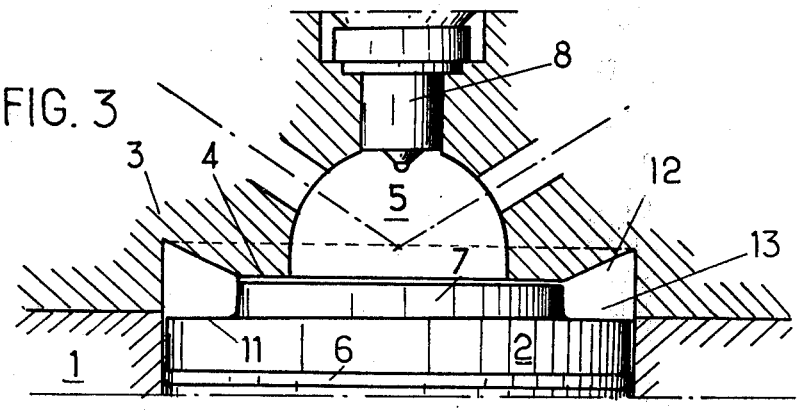
FIG. 3 is a partial sectional veiw of another embodiment of the engine of FIG. 1.

According to the second embodiment illustrated in FIG. 3, the ventilation chamber comprises an annular recess 12 which is provided on the outside periphery of the impeller surface 4 and which, like the elementary chamber 9, is isolated from the combustion chamber when the piston is at top dead center. When the piston is in this position, its flange 7 in fact engages with the impeller surface 4 to close off the connection between this recess and the combustion chamber.

It is to be noted moreover that the volume of the external annular recess 13 defined by the flange is added to that of recess 12, which permits a slower build-up of the pressure and a lower maximum pressure.

At the end of the compression stroke, the gases lying between the impeller surface 4 and the corresponding surface of the flange are all driven, either into the combustion chamber or into recesses 12 and 13. It is obvious that the gases introduced into these latter can then be reached by the ignition wave immediately after the piston has passed to top dead center.

The formation of unburnt gases according to this other embodiment is then also considerably reduced.

It will be appreciated in addition that the reactive mixture used may be very weak since it is energetically stirred up by the turbulence generated by the impeller surface.

As an example, there is given below a table in which are shown the amounts of pollutants emitted by the two-stroke engine of the invention and its specific consumption and the corresponding data relative to a conventional engine, these latter having been taken from existing literature.

| | Invention engine | Conventional engine |
|---|---|---|
| Unburnt gases (HC) g/hp/h | 9 | 130 |
| Carbon monoxide (CO) g/hp/h | 30 | 94 |
| Nitrogen monoxide (NO) g/hp/h | 1.5 | 3 |
| Specific consumption (Cs) g/hp/h | 280 | 400 |

-continued

Consequently it can be seen that the engine of the invention permits:
- a diminution of the amount of unburnt gases in a ratio of 1 : 14;
- a reduction of the emission of CO in a ratio of 1 : 3;
- a reduction of the emission of NO in a ratio of 1 : 2; and
- an improvement of the overall consumption of at least 28%.

While two preferred embodiments have been described and shown by way of example only, it will be understood that modifications and variations may be effected without departing from the scope of the following claims.

What I claim is:

1. A two-stroke engine comprising:
    a cylinder;
    a piston movable in the cylinder;
    a cylinder head including a combustion chamber having a cross-sectional area smaller than the cylinder, the combustion chamber including means for the introduction of fuel mixture directly therein;
    a ventilation chamber formed in the cylinder head around the combustion chamber and opening directly into both the cylinder and the combustion chamber, the ventilation chamber forming an impeller surface; and
    a circular flange formed on the head of the piston and coaxial therewith, the flange having a radius substantially less than that of the piston progressively closing the opening of the ventilation chamber into the combustion chamber as the piston approaches top dead center.

2. A two-stroke engine according to claim 1, characterized in that the ventilation chamber comprises a plurality of elementary ventilation chambers uniformly distributed in the impeller surface around the combustion chamber and each opening into the combustion chamber, the progressive closure of the plurality of elementary chambers being effected by the insertion of the flange of the piston partially into the combustion chamber.

3. A two-stroke engine according to claim 5 characterized in that the ventilation chamber comprises an annular recess formed on the outer periphery of the impeller surface.

4. A two-stroke engine according to claim 3, characterized in that the flange of the piston defines with the piston head an external annular recess whose volume is added to that of the ventilation chamber.

* * * * *

UNITED STATES PATENT AND TRADEMARK OFFICE
CERTIFICATE OF CORRECTION

PATENT NO. : 4,067,301
DATED : January 10, 1978
INVENTOR(S) : Philippe Jarry

It is certified that error appears in the above-identified patent and that said Letters Patent are hereby corrected as shown below:

Column 4, line 50, change "5" to --1--.

Signed and Sealed this

Twenty-second Day of August 1978

[SEAL]

Attest:

RUTH C. MASON
*Attesting Officer*

DONALD W. BANNER
*Commissioner of Patents and Trademarks*